US011963067B2

(12) United States Patent
Baek et al.

(10) Patent No.: US 11,963,067 B2
(45) Date of Patent: Apr. 16, 2024

(54) METHOD FOR PROVIDING LOCATION TRACKING SERVICE ON BASIS OF CONTEXT-AWARE INFORMATION OF LOCATION TRACKER

(71) Applicant: AMOTECH CO., LTD., Incheon (KR)

(72) Inventors: Hyungil Baek, Yongin-si (KR); Kyunghyun Ryu, Seoul (KR); Hoeyoung Hwang, Gunpo-si (KR); Chanwoo Lee, Yongin-si (KR); Seongjae Ahn, Suwon-si (KR)

(73) Assignee: AMOTECH CO., LTD., Incheon (KR)

( * ) Notice: Subject to any disclaimer, the term of this patent is extended or adjusted under 35 U.S.C. 154(b) by 372 days.

(21) Appl. No.: 17/615,197

(22) PCT Filed: May 27, 2020

(86) PCT No.: PCT/KR2020/006860
§ 371 (c)(1),
(2) Date: Nov. 30, 2021

(87) PCT Pub. No.: WO2020/242198
PCT Pub. Date: Dec. 3, 2020

(65) Prior Publication Data
US 2022/0232349 A1 Jul. 21, 2022

(30) Foreign Application Priority Data
May 30, 2019 (KR) .......................... 10-2019-0063747

(51) Int. Cl.
*H04W 4/029* (2018.01)
*H04W 4/021* (2018.01)
(Continued)

(52) U.S. Cl.
CPC .......... *H04W 4/029* (2018.02); *H04W 4/021* (2013.01); *H04W 4/80* (2018.02); *H04W 4/90* (2018.02)

(58) Field of Classification Search
CPC ......... H04W 4/029; H04W 4/90; H04W 4/80; H04W 4/021
(Continued)

(56) References Cited

U.S. PATENT DOCUMENTS 10,650,649 B2    5/2020  Mysell
2017/0352257 A1* 12/2017 Oliver ..................... H04W 4/33

FOREIGN PATENT DOCUMENTS

KR   10-2018-0122816   11/2018
KR   10-1970917        4/2019
WO   2018-045434       3/2018

OTHER PUBLICATIONS

International Search Report dated Aug. 28, 2020 in International Patent Application No. PCT/KR2020/006860.
(Continued)

*Primary Examiner* — Ted M Wang
(74) *Attorney, Agent, or Firm* — Insight Law Group, PLLC; Seung Lee (57) ABSTRACT

A method for providing a location tracking service on the basis of context-aware information of a location tracker, according to the present invention, transmits a signal while changing a communication method by classify a situation as an emergency situation and a normal state which is a non-emergency situation according to the context-aware information of the location tracker, such that it is possible to use power consumption reduced by a low-power communication method in the normal state, and in case of the emergency situation, to safely handle the emergency situation through a sufficient power communication method.

10 Claims, 4 Drawing Sheets

(51) Int. Cl.
*H04W 4/80* (2018.01)
*H04W 4/90* (2018.01)

(58) Field of Classification Search
USPC ..................................................... 455/404.2
See application file for complete search history.

(56) References Cited

OTHER PUBLICATIONS

Written Opinion of the International Searching Authority dated Aug. 28, 2020 in International Patent Application No. PCT/KR2020/006860.

"Report on Location-Based Services User Needs and Requirements. The European GNSS' User Consultation Platform", European Global Navigation Satellite Systems Agency, Issue 1.0, Oct. 31, 2018, [retrieved on Nov. 30, 2021], Retrieved from the Internet: <https://www.gsc-europa.eu/sites/default/files/sites/all/files/Report_on_User_Needs_and_Requirements_LBS.pdf>, pp. 1-86.

Anuga, Godfrey et, al., "A Survey on 5G Networks for the Internet of Things: Communication Technologies and Challenges", IEEEACCESS, 10.1109/ACCESS.2017.2779844, Dec. 4, 2017, [retrieved on Nov. 30, 2021], Retrieved from the Internet: <https://ieeexplore.ieee.org/stamp/stamp.jsp?tp=&arnumber=8141874>, pp. 3619-3647.

\* cited by examiner

METHOD FOR PROVIDING LOCATION TRACKING SERVICE ON BASIS OF CONTEXT-AWARE INFORMATION OF LOCATION TRACKER

CROSS-REFERENCE TO RELATED APPLICATIONS

This application is the U.S. national stage filing under 35 U.S.C § 371 of PCT application number PCT/KR2020/006860, filed on May 27, 2020, which claims priority from and the benefit of Korean Patent Application No. 10-2019-0063747, filed on May 30, 2019. The disclosures of the above-listed applications are hereby incorporated by reference herein in their entirety.

BACKGROUND

Field

The present invention relates to a method for providing a location tracking service based on situational awareness information of a location tracking device, and more particularly, to the method for providing the location tracking service with minimum power and efficiency according to the situational awareness information of the location tracking device.

Discussion of the Background

Recently, for the elderly with dementia, a geo-fence serviceable location tracking device and communication service have been proposed to prevent fatal accidents caused by leaving the house or zone. In addition, the market for devices and communication services targeting the elderly with dementia has been expanding to fat and livestock.

In general, Geo-Fence is a compound word of Geographic and Fence. It means a virtual fence installed in a specific geographic area using a location-based service (LBS, Location) in an application. An application program interface (API) that supports virtual fences in specific areas is called geofencing. The geofencing is an interface using a global positioning system (GPS), which is one of the location tracking technologies. A user may check the entry status of the virtual fence by designating the virtual fence in the form of a circle or a rectangle in the specific area through the GPS.

However, there have been difficulties in expanding the service due to a limitation of high service cost, a low-precision, and a limited-service area where the equipment is installed, a battery capacity of the location tracking device, because the fence service is performed using a mobile communication network, Bluetooth, or Wireless Fidelity (WI-FI), etc.

Accordingly, devices and methods that can provide low-power and low-cost services using Low Power Wide Area Network (LPWAN) rather than mobile communication networks have been proposed to overcome the high cost, tracking distance, and limitations of battery capacity A location tracking service method of efficient minimum power consumption has been needed through the functional combination of low-power and long-distance data transmission, which is the strength of LPWAN, with the advantages of a lightweight analysis engine and data compatibility SW platform structure.

The above information disclosed in this Background section is only for enhancement of understanding of the background of the inventive concept, and, therefore, it may contain information that does not form the prior art that is already known in this country to a person of ordinary skill in the art.

SUMMARY

Accordingly, the technical problem of the present invention has been conceived in this respect, and an object of the present invention relates to a method for providing a location tracking service by selecting an optimal location tracking module and communication method according to situational awareness information of the location tracking device.

To solve the above problem and defects, the present invention provides a method of providing location tracking service based on situational awareness information of a location tracking device, the method comprising detecting the situational awareness information measured by a situation analysis engine of the location tracking device, the situational awareness information comprising a heart rate, a body temperature, a movement status of a user, and situation information acknowledged by sensors configured to receive signals in the vicinity of the location tracking device; determining a situation or a surrounding situation of the user of the location tracking device based on the situational awareness information measured by the situation analysis engine of the location tracking device; selecting a location tracking module to be used for a location tracking in the location tracking device based on a power consumption criterion and a precision criterion of the location tracking module according to the determined situation based on whether the user is in an emergency state or a non-emergency state and the user's location is indoors or outdoors, the location tracking module comprising at least one of SIGFOX, Bluetooth Low Energy (BLE), Global Positioning Service (GPS), Wireless Fidelity (WI-FI), and Low Power Wide Area Network (UWB); detecting location data of the user of the location tracking device using the selected location tracking module; selecting a communication method for transmitting the detected situational awareness information and location data based on determining if the user of the location tracking device is in the emergency state, if a response message is available to confirm that a signal sent from the location tracking device is received to a network server when the user is in the non-emergency state, and if an interference recovery operation is available in a state in which the response message is available, the communication method comprising at least one of SIGFOX, LoRa (Long Range), NB_IoT (Narrow Band Internet of Things), LTE CAT.M1 (Long Term Evolution Category 1 Machine Type Communication), and 5G (5 Generation); and transmitting the situational awareness information and location data to the network server using the selected communication method.

That is, the effect of the present invention is to minimize power consumption while varying the location tracking module and communication method according to the situation information of the location tracking device that can be worn on the elderly with dementia, infant, or animal, and sufficiently cope with location tracking in emergency situations.

However, the effects of the present invention are not limited to the above effects, and may be variously expanded without departing from the spirit and scope of the present invention.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Hereinafter, embodiments of the present invention will be described in more detail with reference to the drawings.

Since the present invention can have various changes and can have various forms, specific embodiments are illustrated in the drawings and described in detail in the specification. However, this is not intended to limit the present invention to the specific disclosed form, it should be understood to include all modifications, equivalents and substitutes included in the spirit and scope of the present invention.

Figure 1:
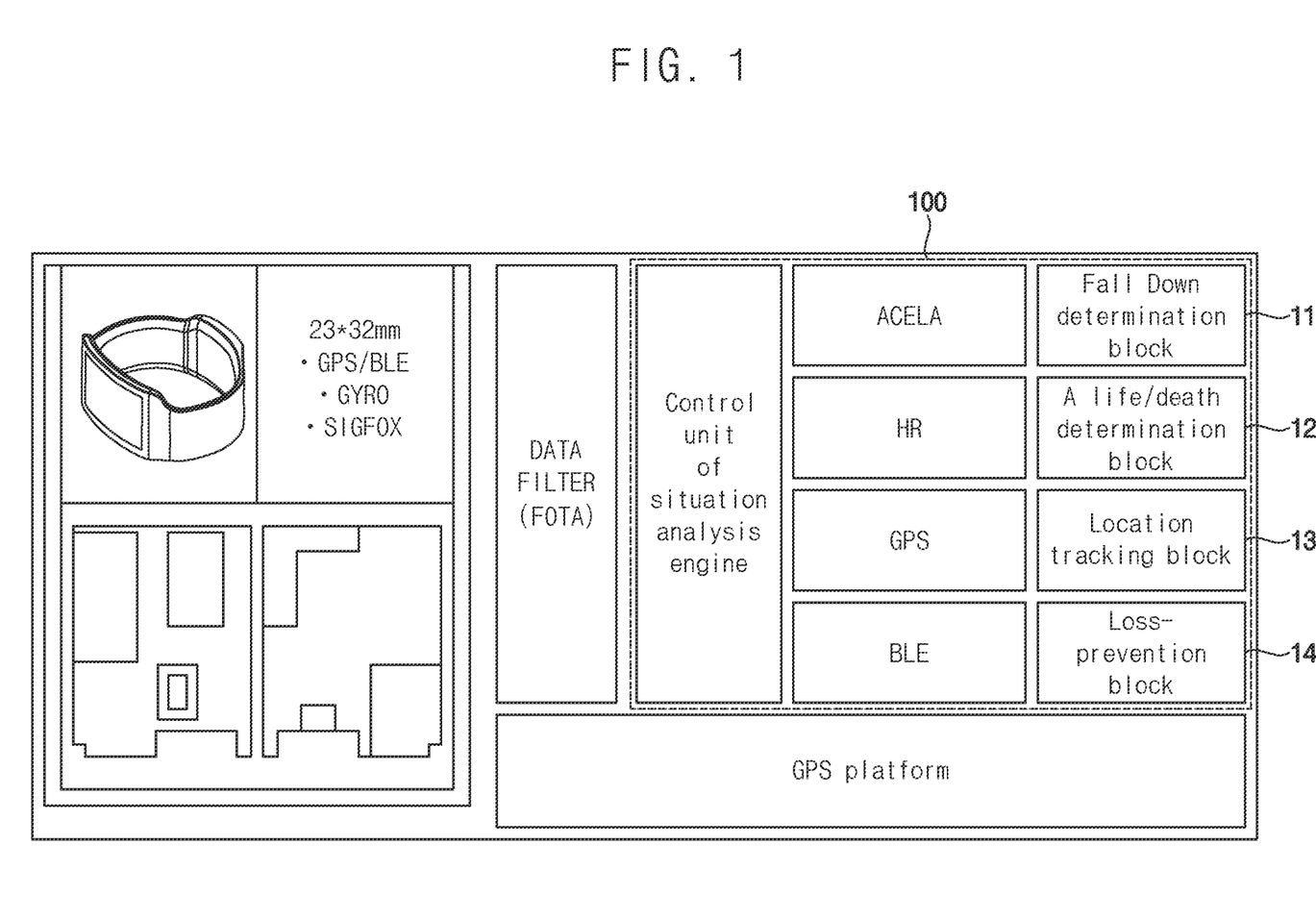
FIG. 1 is a functional block diagram of a situation analysis engine in a location tracking device according to an embodiment of the present invention.

FIG. 1 is a functional block diagram of a situation analysis engine 100 in a situational-awareness location tracking device 1 according to an embodiment of the present invention.

Referring to FIG. 1, the situation analysis engine 100 has a main function that can determine various situations of the user having the location tracking device 1.

Among the situation analysis engine 100, a life/death determination block 12 may determine the life/death of user by measuring the heart rate. Accordingly, the user's body temperature measured with a thermometer may be used as an auxiliary means for determining whether user survives or not. In addition, the movement information from an accelerometer and the received situation information from peripheral sensors may be used as the auxiliary means to determine whether the user survives or not.

The peripheral sensors may refer to sensors that are periodically transmitting signals using communication in the vicinity of the location tracking device 1. The situation analysis engine 100 may have functions of detecting and analyzing these received signals from the peripheral sensors.

A location tracking block 13 of the situation analysis engine 100 may perform a location tracking with a Global Positioning System (GPS), a Bluetooth Low Energy (BLE), a WIFI Sniffing, or an Ultra-Wide Band (UWB) module. In addition, the location tracking function of SIGFOX may be utilized as a means of location tracking.

A loss-prevention block 14 of the situation analysis engine 100 may detect whether the user deviates from the geo-fence area and provide a notification service to the user about the deviation from geo-fence area.

In the situation analysis engine 100, a fall down determination block 11 may detect whether a fall-down has occurred to the user and transmit the fall-down information to the network for an emergency processing.

The situation analysis engine 100 may define criteria that can be regarded as emergency situations with respect to matters determined in various functional blocks.

The life/death determination block 12 may determine that an emergency has occurred when there is the situation in which the user's heart rate is significantly reduced or disappears. The life/death determination block 12 may determine the emergency has occurred when fire or toxic gas is ejected by acknowledged from the peripheral sensors.

The location tracking block 13 may determine that the user is in the emergency which is an emergency location tracking required because the user's location is not tracked.

The loss-prevention determination block 14 may determine that the user is in the emergency when the user deviates from the geo-fence area.

The fall down determination block 11 may determine that the user is in the emergency when the position of user is detected to fall down.

Based on the definition of the situation awareness, the situation analysis engine 100 of the location tracking device 1 may determine the emergency situations encountered by the user and change a location tracking module and a communication method in the location tracking device 1 accordingly to minimize power consumption for long time data transmission.

Figure 2:
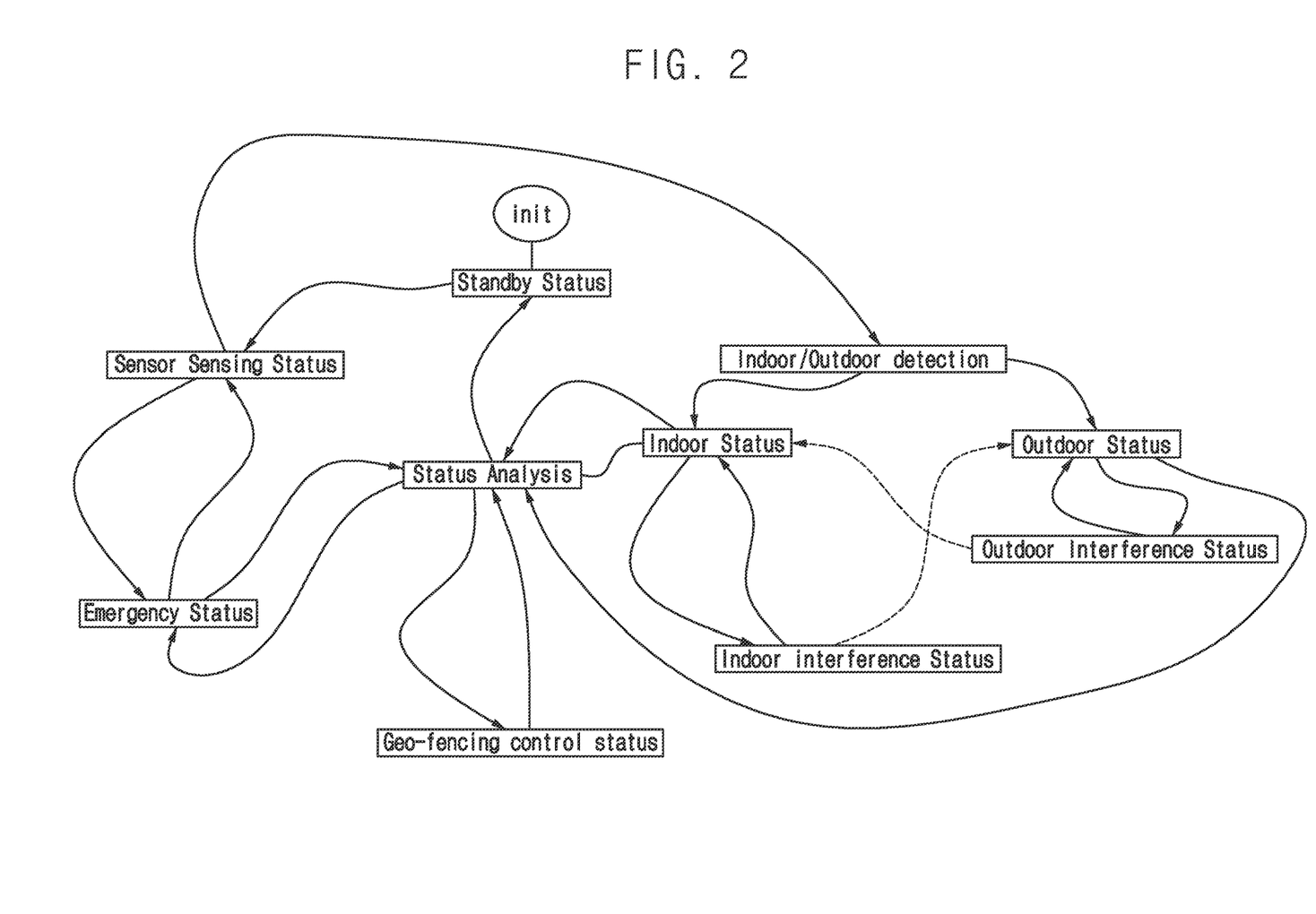
FIG. 2 is a state definition and various state transition diagrams for situational awareness.

FIG. 2 is state definitions for the situation-awareness of the situation analysis engine 100 and various state transition diagrams.

Referring to FIG. 2, the Standby Status may refer a standby status after the initialization of the location tracking device 1, at which time a system checks of the location tracking device 1 is performed.

A Sensor Sensing Status may refer a status that measures a heart rate, a body temperature, and an acceleration, and checks whether this state is an emergency or not.

An Emergency Status may refer a status of processing when the emergency state occurs according to the definition of the emergency.

A Status Analysis may mean a status that is in charge of analyzing and managing information from each status.

An Indoor/Outdoor detection may mean a location analysis on whether the location of the location tracking device 1 is indoor or outdoor.

An Indoor Status may refer a status of processing and managing when the location of the location tracking device 1 is in the indoor.

An Outdoor Status may refer to a status of processing and managing when the location of the location tracking device 1 is in the outdoor.

An Indoor Interference Status may refer a status of checking and observing the change of location data in the indoor.

An Outdoor Interference Status may refer a status of checking and observing the change of location data in the outdoor.

A Geo-Fencing Control Status may refer a status in which a processing for the location tracking device 1 when the user leaves the geo-fence.

Referring to FIG. 2, all status can be transitioned to other status at any time or freely.

In the method of providing a location tracking service based on situational awareness information of the location tracking device 1, the situation analysis engine 100 of the location tracking device 1 may receive a signal related to the heart rate, body temperature, and movement status of user, and the sensors existing the vicinity of the location tracking device 1.

The situation or the surrounding situation of user of the location tracking device may be determined from the situation awareness information measured by the situation analysis engine 100 of the location tracking device 1.

Figure 3:
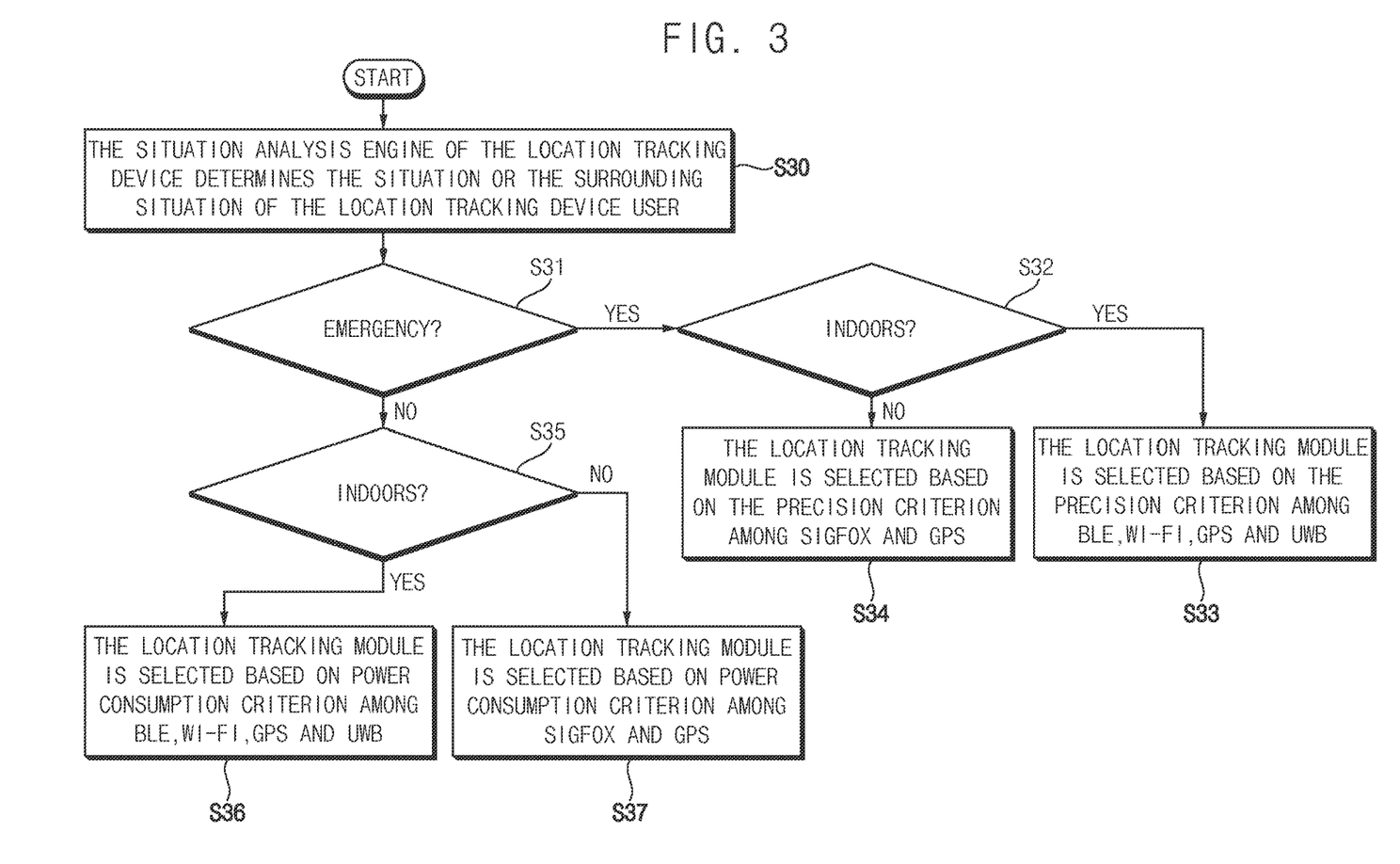
FIG. 3 is a flowchart illustrating a method of determining a location tracking module according to a location of a location tracking device user.

FIG. 3 is a flowchart illustrating a method of determining the location tracking module according to the location of the user of the location tracking device.

According to a determined situation, the algorithm for selecting the location tracking module to be used for the location tracking of the location tracking device which is consisting of SIGFOX, BLE (Bluetooth Low Energy), GPS, WI-FI, and UWB module based on the determined situation may determine that the location of the location tracking device user is indoors or outdoors. After determination, the location tracking module to be used may be determined based on power consumption criterion and precision criterion of modules.

The power consumption criterion may be set in the order of SIGFOX<BLE<GPS<WI-FI<UWB from the module with low power consumption to the module with large power consumption. The precision criterion may be set in the order of SIGFOX<BLE<GPS<WI-FI<UWB from the module with low precision to the module with high precision.

In one embodiment, when the location of the location tracking device user is indoors, BLE, WI-FI, GPS, and UWB may be classified as usable modules, and when the location of the location tracking device user is outdoors, SIGFOX and GPS may be classified as usable modules.

The emergency situation of the situation analysis engine 100 of the location tracking device 1 may be a situation in which the user's heart rate significantly decreases or disappears, a situation where the user's location is not tracked and the emergency location tracking is necessary, a situation where the user leaves the geo-fence, a situation where the user's fall is detected, and a situation where acknowledged by surrounding sensors that can receive signals in the vicinity that fire or toxic gas is ejected.

In one embodiment, when the situation analysis engine of the location tracking device determines that the situation is an emergency, the location tracking module to be used may be classified according to whether the user's location is indoors or outdoors, and then the location tracking module to be used may be determined according to the precision criterion of the classified modules.

Since the available modules may vary due to surrounding circumstances, the location tracking module may be determined based on the module that can be supported at the location where the location tracking device user is located. For example, in the situation where location tracking by WI-FI may not be possible because there is no AP (Access Point) for WI-FI in the vicinity, then the location tracking module may be selected among other usable modules.

When the situation analysis engine 100 of the location tracking device 1 is determined to be in a non-emergency state, the available modules are classified according to whether the location of the location tracking device user is indoors or outdoors, and the lowest-power consumption module among the classified available modules according to the surroundings may be configured as location tracking modules.

Referring to FIG. 3, a process for determining the location tracking module may be described as follows.

The situation analysis engine 100 of the location tracking device 1 may determine the situation or the surrounding situation of the location tracking device user (S30).

It may be determined whether the determined situation is an emergency (S31).

It may be determined whether the determined emergency has occurred indoors or outdoors (S32).

If the emergency occurs indoors, the location tracking module may be selected based on the high precision among BLE, WI-FI, GPS, and UWB (S33).

If the emergency occurs outdoors, the location tracking module may be selected based on the high precision among SIGFOX and GPS (S34).

It may be determined whether the determined situation is the non-emergency and whether the determined situation is occurred indoors or outdoors (S35).

If the non-emergency situation occurs indoors, the location tracking module may be selected based on the lower power consumption among BLE, WI-FI, GPS, and UWB (S36).

If the non-emergency situation occurs outdoors, the location tracking module may be selected based on the lower power consumption among SIGFOX and GPS (S37).

The location of the location tracking device user may be determined by using the determined location tracking module.

According to the determined situation, a communication method appropriated the communication networks supported in the vicinity and the available communication networks according to the movement of the location tracking device user may be selected. The communication method may consist of SIGFOX, Long Range (LoRa), Narrow Band Internet of Things (NB_IoT), Long Term Evolution Category 1 Machine Type communication (LTE CAT.M1) and 5G (5 Generation). The determined situation and location data may be transmitted using the determined communication method to the available network server.

Figure 4:
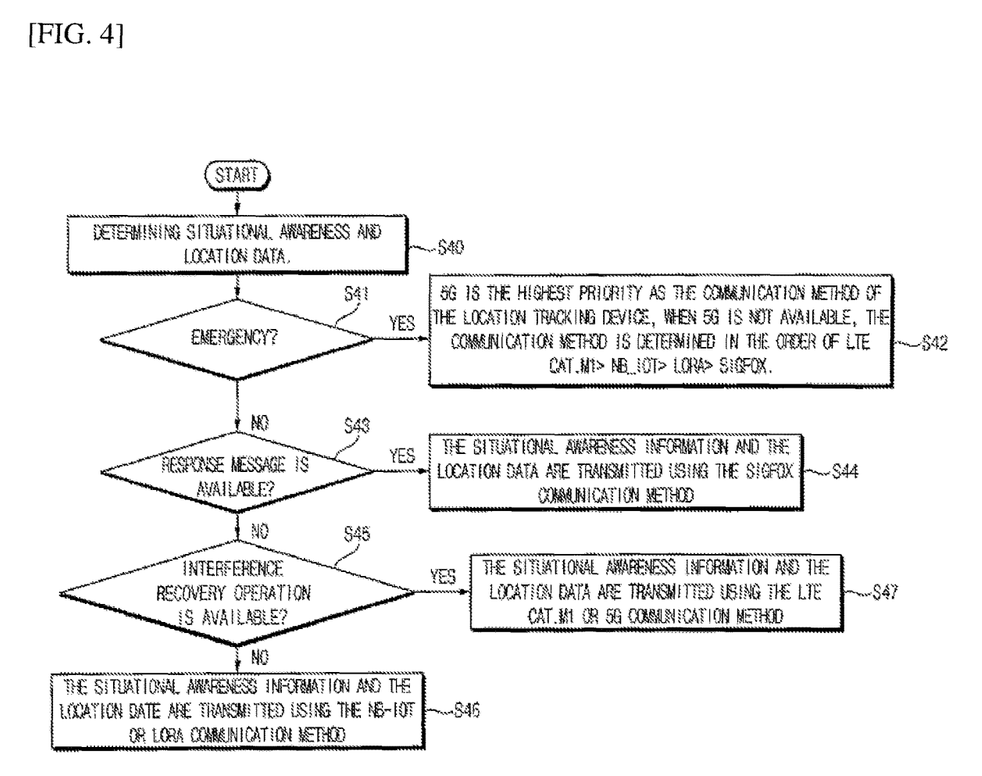
FIG. 4 is a flowchart illustrating a method of determining a communication method according to the determined situation and a communication network supported in the vicinity.

FIG. 4 is a diagram illustrating a method of determining the communication method according to the determined situation and the communication network supported in the vicinity.

In order to transmit the determined situation and location data by the communication method supported by the location tracking device may be determined among SIGFOX, LoRa, NB_IoT, LTE CAT.M1, and 5G (S40).

The criteria for determining among the SIGFOX, LoRa, NB_IoT, LTE CAT.M1 and 5G communication methods may be as follows. The SIGFOX may be the communication method that enables one-way data communication about 10 times a day. The LoRa may be the communication method that enables one-way data communication about more than 10 times a day and two-way communication depending on the settings. The NB_IoT may be the communication method that supports voice communication, linked with 3G/4G, and enable two-way communication depending on the settings. The LTE CAT.M1 may be the communication method that supports voice communication, two-way real-time communication, and enables roaming. The 5G may be the communication method that supports voice communication, two-way real-time communication, enables roaming, low latency, high power, and excellent connectivity. The communication method may be selected according to the determined situation, the communication network supported in the vicinity, and the available communication network according to the movement of the location tracking device user.

It is first determined whether the information sent from the location tracking device is related to the emergency (S41).

If the situation information sent from the location tracking device 1 is an emergency, 5G is the highest priority as the communication method of the location tracking device, when 5G is not available, the communication method is determined in the order of LTE CAT.M1>NB_IoT>LoRa>SIGFOX (S42).

It is determined whether a response message (ACK/NACK) is available to confirm that a signal sent from the location tracking device is received to the network server (S43). If the response (ACK/NACK) message is not available to confirm that the signal sent from the location tracking device is received to the network server, it may be determined that only one-way communication is available at that location. Therefore, the situational awareness information and location data may be transmitted using the SIGFOX communication method (S44).

In addition, it is further determined whether an interference recovery operation is available in the state in which the response message is available (S45). That is, in the two-way communication, when the response message indicates that the previously transmitted signal is not received to the network server, a retransmission of the previously transmitted signal may be proceed through the interference recovery operation.

When the interference recovery operation is not available in the state in which the response message is received, the situation information and location data may be transmitted using the NB-IoT or LoRa communication method (the communication method in which interference recovery operation is available only through separate settings) (S46). In other words, if the interference recovery operation is not available even though the response message is received from network server, it may be determined that the situational awareness information and location data may be transmitted using NB_IoT or LoRa communication method.

When the interference recovery operation is available in the state in which the response message is received, the situational awareness information and location data may be transmitted using the LTE CAT.M1 or 5G communication method (S47).

As confirming by above process, when the two-way and real-time communication method is available, the situational awareness information and location data may be transmitted to the network server using the two-way and real-time communication method at a higher data rate and more frequent transmission cycle. That means the communication method can be LTE CAT.M1 or 5G rather than the SIGFOX, LoRa or NB_IoT.

In this way, by classifying the communication method into emergency and non-emergency, and transmitting signals while changing the communication method, the power consumption may be reduced in a non-emergency situation by using the low-power communication method, or the power consumption may be increased in emergency situations to ensure safe transmission of the information.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of providing location tracking service based on situational awareness information of a location tracking device, the method comprising:
    detecting the situational awareness information measured by a situation analysis engine of the location tracking device, the situational awareness information comprising a heart rate, a body temperature, a movement status of a user, and situation information acknowledged by sensors configured to receive signals in the vicinity of the location tracking device;
    determining a situation or a surrounding situation of the user of the location tracking device based on the situational awareness information measured by the situation analysis engine of the location tracking device;
    selecting a location tracking module to be used for a location tracking in the location tracking device based on a power consumption criterion and a precision criterion of the location tracking module according to the determined situation based on whether the user is in an emergency state or a non-emergency state and the user's location is indoors or outdoors, the location tracking module comprising at least one of SIGFOX, Bluetooth Low Energy (BLE), Global Positioning Service (GPS), Wireless Fidelity (WI-FI), and Low Power Wide Area Network (UWB);
    detecting location data of the user of the location tracking device using the selected location tracking module;
    selecting a communication method for transmitting the detected situational awareness information and location data based on determining if the user of the location tracking device is in the emergency state, if a response message is available to confirm that a signal sent from the location tracking device is received to a network server when the user is in the non-emergency state, and if an interference recovery operation is available in a state in which the response message is available, the communication method comprising at least one of SIGFOX, LoRa (Long Range), NB_IoT (Narrow Band Internet of Things), LTE CAT.M1 (Long Term Evolution Category 1 Machine Type Communication), and 5G (5 Generation); and
    transmitting the situational awareness information and location data to the network server using the selected communication method.

2. The method of claim 1, wherein the situation analysis engine comprises:
    a life/death determination block for determining the life/death of the user by measuring a heart rate, a body temperature, a fall-down, ejection of fire or toxic gas acknowledged by sensors receiving signals in the vicinity of the location tracking device;
    a location tracking block for performing a location tracking with the GPS, the BLE, the WIFI Sniffing, or the UWB module;
    a loss-prevention block for detecting whether the user deviates from a geo-fence area and providing a notification service to the user about the deviation from the geo-fence area; and
    a fall down determination block for detecting whether a fall-down has occurred to the user and transmitting the fall-down information to the network server for an emergency processing.

3. The method of claim 1, wherein:
    if the user's location, the usable location tracking modules are BLE, WI-FI, GPS and UWB, and if the user's location is outdoors, the usable location tracking modules are SIGFOX and GPS;
    the power consumption criteria is set in the order of SIGFOX<BLE<GPS<WI-FI<UWB from the location tracking module with low power consumption to the location tracking module with large power consumption, and
    wherein the precision criterion is set in the order of SIGFOX<BLE<GPS<WI-FI<UWB from the location tracking module with low precision to the location tracking module with high precision.

4. The method of claim 1, wherein the emergency state of the situation analysis engine of the location tracking device comprises at least one of a situation in which the user's heart rate significantly decreases or disappears, a situation where the user's location is not tracked and emergency location tracking is necessary, a situation where the user leaves a geo-fence area, a situation where the user's fall is detected, and a situation where acknowledged by surrounding sensors that can receive signals in the vicinity that fire or toxic gas is ejected.

5. The method of claim 1, wherein if the user of the situation analysis engine of the location tracking device is in the emergency state and the user's location is outdoors, the location tracking module is selected based on the highest precision among SIGFOX and GPS, and wherein if the user of the situation analysis engine of the location tracking device is in the emergency state and the user's location is indoors, the location tracking module is selected based on the highest precision among BLE, WI-FI, GPS, and UWB.

6. The method of claim 1, wherein if the user of the situation analysis engine of the location tracking device is in the non-emergency state and the user's location is outdoors, the location tracking module is selected based on the lowest power consumption among SIGFOX and GPS, and wherein if the user information of the situation analysis engine of the location tracking device is in the non-emergency state and the user's location is indoors, the location tracking module is selected based on the lowest power consumption among BLE, WI-FI, GPS, and UWB.

7. The method of claim 1, wherein if the user of the situation analysis engine of the location tracking device is in the emergency state, 5G is the highest priority as the communication method of the location tracking device, and when 5G is not available, the communication method is determined in the order of LTE CAT.M1>NB_IoT>LoRa>SIGFOX.

8. The method of claim 1, wherein if the response message is available to confirm that the signal sent from the location tracking device is received to the network server when the user is in the non-emergency state, the situational awareness information and location data are transmitted using SIGFOX communication method.

9. The method of claim 1, wherein if the interference recovery operation is not available in the state in which the response message is available, the situational awareness information and location data are transmitted using NB-IOT or LoRa communication method.

10. The method of claim 1, wherein if the interference recovery operation is available in the state in which the response message is available, the situational awareness information and location data are transmitted using LTE CAT.M1 or 5G communication method.

* * * * *